Patented Aug. 2, 1932

1,870,104

UNITED STATES PATENT OFFICE

HENRY DREYFUS, OF LONDON, ENGLAND

PRODUCTION OF OXYGENATED ALIPHATIC COMPOUNDS

No Drawing. Application filed May 27, 1926, Serial No. 112,170, and in Great Britain June 26, 1925.

The object of the present invention is the manufacture of ketene, acetic acid or acetic anhydride or mixtures thereof from acetaldehyde.

Ketene has hitherto been prepared by passing vapours of acetic anhydride, acetone or ethyl acetate over electrically heated wire or across electric arcs or by passing vapours of acetic anhydride, acetone or methyl ethyl ketone over fireclay or broken porcelain heated to about 500° or 600° C.

I have now found that ketene may readily be obtained by subjecting acetaldehyde vapours, with or without pressure, to relatively high temperatures, preferably in presence of hydrogen splitting catalysts. The reaction may be performed by passing the aldehyde vapours over the heated catalysts, such as nickel, copper, zinc or any other hydrogen splitting catalysts. The temperature employed should preferably not be above about 400° to 500° C. and preferably between about 150° and 300° C. The reaction may, however, be effected at higher temperatures without catalyst, but in such case the reaction is not so favourable.

Owing to its very low boiling point the ketene formed may be readily separated from unconverted aldehyde, the latter being readily condensed by cooling the reaction gases, for example by brine cooling or the like.

The ketene may be collected as such in the gaseous state. It may be employed for acetylation processes or for any other desired uses. Ketene can be employed with great advantage for the manufacture of cellulose acetate, as it can be used direct for acetylation purposes.

Further according to the invention the ketene obtained as above mentioned or the reaction gases containing it may be used to form acetic acid, especially glacial or concentrated acetic acid, or acetic anhydride, or mixtures thereof, or mixtures of one or both of them with ketene, by absorbing or treating the ketene or reaction vapours with appropriate quantities of water or acetic acid, preferably after first freeing the ketene or reaction vapours from unconverted aldehyde. For such absorption or treatment the water or acetic acid may be employed in the liquid state or as steam or vapour. Mixtures of water and acetic acid in liquid or vapour form may likewise be employed. According to the relative quantity of water introduced into the reaction gases or ketene or used for absorbing the same, acetic acid, acetic anhydride or mixtures thereof or mixtures of one or both of them with ketene will result. Thus if one molecule of water is employed relatively to two molecules of ketene, acetic anhydride results, whilst if two molecules of water are employed relatively to two molecules of ketene, acetic acid results. Similarly if acetic acid vapour is introduced into the reaction gases or ketene or if acetic acid is used for absorbing the same, acetic anhydride or mixtures thereof with acetic acid or mixtures of either or both of them with ketene may result according to the relative proportions of acetic acid employed, while if water is present in sufficient quantity in the acetic acid employed acetic acid may also be formed. Where water is employed for the treatment or absorption or is present in the acetic acid employed therefor it should preferably be only in restricted quantities insufficient to result in the production of acetic acid of low or relatively low concentration, unless it is desired to obtain lower concentration intentionally.

According to another form of the present invention I may mix water vapour or acetic acid vapour, or both said vapours, with acetaldehyde vapour, and by subjecting the mixed vapours, with or without pressure, to the action of heat in presence or absence of hydrogen splitting catalysts in an analogous manner to what is above indicated, I may obtain acetic acid or acetic anhydride or mixtures thereof or mixtures of either or both of them with ketene, the aldehyde being first decomposed to from ketene which immediately combines with the water or acetic acid to form acetic acid or acetic anhydride. In such cases water should only be employed or present in restricted quantities insufficient to result in the production of acetic acid of low or relatively low concentrations, unless it is desired to obtain lower concentrations intentionally.

The reaction may be performed under similar conditions of temperature to those for the production of ketene as above referred to and similar catalysts may be employed.

The acetaldehyde used for the purpose of the present invention may be of any origin.

If desired, however, it may be produced by passing the vapours of acetic acid (glacial, concentrated or dilute) together with reducing gases such as hydrogen or gases containing hydrogen, e. g. water gas, town gas, producer gas, etc., or it may even be carbon monoxide, or gases containing it either with or without hydrogen, in contact with heated catalysts or contact materials. In such case, similarly to what is described in my application for U. S. Patent S. No. 112,168 herewith the reducing gas or gases may be employed in about the theoretically necessary proportions of one molecule per molecule of acetic acid or preferably in some excess over same, but without limitation however to these proportions; as catalysts any suitable metals or substances such as are known to promote reduction reactions may be employed, for instance metals such as nickel, iron, zinc, tin, lead, silver, platinum, palladium, copper and so forth, or other substances or contact materials may be employed such for instance as pumice, glasswool, sodium chloride and so forth; or mixtures of any of such catalysts and/or contact materials may be employed; the temperature at which the reaction is carried out may vary very considerably according to the catalyst or contact material employed or other conditions; with finely divided nickel for instance temperatures between about 100° and about 400° C. may be chosen, without limitation however to this range of temperature; the aldehyde formed may be separated by condensation or in any other appropriate way from the mixture resulting from the reaction, and employed for the production of ketene, acetic acid, or acetic anhydride or mixtures of any or all of these as hereinbefore described.

The hydrogen split off during the transformation of the acetaldehyde into ketene or (via intermediately formed ketene) into acetic anhydride or/and acetic acid in any of the forms of process hereinbefore described can be collected separately and used as reducing gas for transforming acetic acid into acetaldehyde by a process such as above indicated.

The term "ketene-acetic group of oxygenated aliphatic compounds" is used in the appended claims to denote the group of organic compounds consisting of ketene, acetic anhydride and acetic acid. For convenience of reference, acetic anhydride and acetic acid are denoted by the generic expression "hydrated members of the ketene-acetic group of oxygenated aliphatic compounds." The phrase "substances capable of reacting with ketene to form hydrated members of the ketene-acetic group of oxygenated aliphatic compounds" is used generically to include the substances acetic acid and water.

What I claim and desire to secure by Letters Patent is:—

1. A process of manufacturing members of the ketene-acetic group of oxygenated aliphatic compounds, which comprises subjecting acetaldehyde in the form of vapor to a temperature above 150° C. and not exceeding 400° or 500° C. in presence of a hydrogen splitting catalyst.

2. A process of manufacturing members of the ketene-acetic group of oxygenated aliphatic compounds, which comprises subjecting acetaldehyde in the form of vapor to a temperature between 150° and 300° C. in presence of a hydrogen splitting catalyst.

3. A process of manufacturing members of the ketene-acetic group of oxygenated aliphatic compounds which comprises subjecting acetaldehyde in the form of vapor to a temperature exceeding 150° C. in presence of finely divided nickel.

4. A process of manufacturing members of the ketene-acetic group of oxygenated aliphatic compounds which comprises subjecting acetaldehyde in the form of vapor to a temperature exceeding 150° C. in presence of copper as catalyst.

5. A process of manufacturing members of the ketene-acetic group of oxygenated aliphatic compounds which comprises subjecting acetaldehyde in the form of vapor to a temperature exceeding 150° C. in presence of zinc as catalyst.

In testimony whereof I have hereunto subscribed my name.

HENRY DREYFUS.